(No Model.)

A. S. & G. S. BOWEN.
MUSICAL BLOCK.

No. 491,833. Patented Feb. 14, 1893.

WITNESSES:
Paul Johat
C. Sedgwick

INVENTORS:
A. S. Bowen
G. S. Bowen
BY Munn & Co
ATTORNEYS.

UNITED STATES PATENT OFFICE.

ANNETTE S. BOWEN AND GOODRIDGE S. BOWEN, OF NEW YORK, N. Y.

MUSICAL BLOCK.

SPECIFICATION forming part of Letters Patent No. 491,833, dated February 14, 1893.

Application filed May 27, 1892. Serial No. 434,590. (No model.)

*To all whom it may concern:*

Be it known that we, ANNETTE S. BOWEN and GOODRIDGE S. BOWEN, of New York city, in the county and State of New York, have invented a new and useful Improvement in Musical Blocks, of which the following is a full, clear, and exact description.

Our invention relates to articles adapted to be both amusing and instructive, and it is the object of the invention to provide a block, or a series of blocks, each block bearing upon its face the name of a certain note, the note itself and its position upon the staff.

It is a further object of the invention to provide each block with a mechanism capable of being operated from the exterior of the block, which mechanism will produce the tone represented by the note produced upon the exterior of the block.

The prime object of the invention is to produce blocks by means of which any person, but more especially children, may be made acquainted with the notes employed in music, their names, their positions upon the music staff, and the tone belonging to each note.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
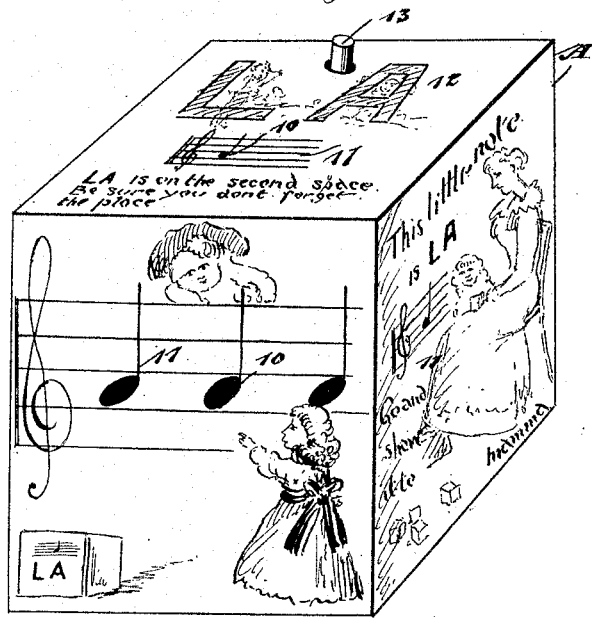
Figure 2:
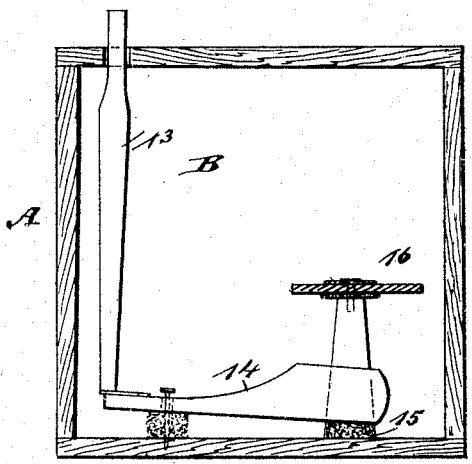
Figure 3:
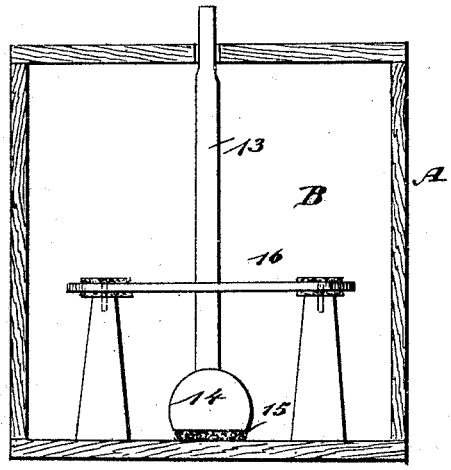

Figure 1 is a perspective view of one of the blocks, constructed in accordance with our invention; Fig. 2 is a section taken practically through the block; and Fig. 3 is another vertical section taken at a right angle to the section shown in Fig. 2.

The block A, may be of any approved contour; ordinarily, however, the blocks are made rectangular, as shown. The blocks are hollow, and their inner chamber B, may be made as large as in practice may be found desirable. Upon the exterior of the block a note is produced, as illustrated at 10, in Fig. 1, and this note may be repeated upon all sides of the block, if found desirable. The note is also shown as placed in its proper position upon the lines or in the spaces of a music staff 11, and adjacent to the note and staff the name of the note is produced in any approved manner, as shown at 12, in Fig. 1, in which figure the note produced is "A" or "La;" and upon different faces of the block various designs are drawn and reading matter is produced, calculated to impress upon the mind of the child or the adult the name and position of the notes upon the staff and represented upon the blocks. In practice eight or more of the blocks are used, each of them, when eight blocks are employed, representing a note in the natural scale, or in any predetermined scale.

In addition to locating the note upon a staff and naming it upon the exterior of the block, it is sought to produce in a simple yet durable way a mechanism for sounding at will the tone properly belonging to the note represented and named upon the block. The mechanism for producing the tone is concealed within the block, being contained in its chamber B. The only portion of the mechanism which is visible is the upper end of a key rod 13, which extends out through an opening in one face of the block. This rod is connected at its lower end with one extremity of a hammer 14, the hammer 14, being pivoted within the chamber B. The striking end of the hammer normally rests upon a pad 15, of felt or like material, and the said striking end of the hammer is located below a bar 16, which when struck will produce the tone demanded by the note designated upon the exterior of the block.

We desire it to be distinctly understood that while in practice we have found the hammer and the bar to be preferable to a reed and bellows, or other means for producing a blast of air and thereby sounding a note, we do not confine ourselves to the hammer and bar.

It will be readily understood that when a number of blocks, say eight, capable of producing all of the notes of the natural scale, are used, a child musically inclined may in addition to memorizing the notes and the tones appertaining to them, may readily play simple tunes upon the blocks.

Having thus described our invention, we claim as new and desire to secure by Letters Patent,—

1. As an improved article of manufacture, a musical block, comprising a block having produced thereon the representation of a note and the position of the note upon a music staff, the said block being also provided with a device for producing the tone appertaining to the note represented, as and for the purpose specified.

2. A musical block, comprising a rectangular block having a note of music and the position of the note upon a music staff produced thereon, together with the name of the note, the block being also provided with a device capable of producing the tone which the note produced upon the block indicates, as and for the purpose specified.

3. A musical block consisting of a hollow block having exteriorly produced thereon a note of music in its proper position upon a music staff, and the name of the note, the block being further provided with a device capable of producing a musical tone corresponding to that which the note represents, substantially as shown and described.

4. A musical block consisting of a hollow rectangular block having produced thereon a music staff, a note upon the staff in proper position, and the name of the note, the block being further provided with a tone-producing device capable of sounding the note shown upon the exterior of the block, the device being concealed within said block and exteriorly operated, as and for the purpose specified.

5. The combination with a hollow block having produced thereon a music staff, a note upon the staff and the name of the note, of a sounding bar in the block, a pivoted hammer adapted to engage the said bar, and a key rod connected to the hammer and projecting through the block, substantially as herein shown and described.

ANNETTE S. BOWEN.
GOODRIDGE S. BOWEN.

Witnesses:
   E. M. CLARK,
   C. SEDGWICK.